(12) United States Patent
Rubitzko et al.

(10) Patent No.: US 12,710,037 B2
(45) Date of Patent: Aug. 18, 2026

(54) FLEXIBLE MOTOR PUMP SYSTEM

(71) Applicant: RAPA Automotive GmbH & Co. KG, Selb (DE)

(72) Inventors: Tim Rubitzko, Selb (DE); Rocco Kemnitz, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 0 days.

(21) Appl. No.: 18/591,098

(22) Filed: Feb. 29, 2024

(65) Prior Publication Data

US 2024/0295218 A1 Sep. 5, 2024

(30) Foreign Application Priority Data

Mar. 1, 2023 (DE) ..................... 10 2023 105 060.5

(51) Int. Cl.
*F04B 53/16* (2006.01)
*F04B 17/03* (2006.01)
*F04B 23/04* (2006.01)
*F04B 49/06* (2006.01)
*B60G 13/08* (2006.01)

(52) U.S. Cl.
CPC .............. *F04B 53/16* (2013.01); *F04B 17/03* (2013.01); *F04B 23/04* (2013.01); *F04B 49/06* (2013.01); *B60G 13/08* (2013.01)

(58) Field of Classification Search
CPC .......... F04B 53/16; F04B 17/03; F04B 23/04; F04B 49/06; B60G 9/02; B60G 13/003; B60G 13/08; B60G 17/08; B60G 2204/20; B60G 2202/413; B60G 2202/416; F16F 9/43; F16F 2228/066
See application file for complete search history.

(56) References Cited

U.S. PATENT DOCUMENTS 5,335,732 A * 8/1994 McIntyre .............. E21B 33/124 166/387
5,957,547 A * 9/1999 Schliebe ................. B60T 8/368 303/DIG. 10

(Continued)

FOREIGN PATENT DOCUMENTS

CN 217632798 U 10/2022
DE 29712033 U1 11/1998

(Continued)

OTHER PUBLICATIONS

Office Action issued on Jan. 10, 2024, in corresponding German Application No. 102023105060.5, 8 pages.

(Continued)

*Primary Examiner* — Loren C Edwards
(74) *Attorney, Agent, or Firm* — Maier & Maier, PLLC

(57) ABSTRACT

An apparatus for making available hydraulic energy, in particular in a chassis system of a vehicle, including at least one motor-pump group and an electronic unit for regulating the motor-pump group. The motor-pump group is arranged in a motor-pump casing that forms a motor-pump housing or is a part of a motor-pump housing. Th electronic unit is arranged in an electronic-unit casing that forms an electronic-unit housing or is a part of an electronic-unit housing, and the electronic unit and the motor-pump group are electrically connected via a supply string.

12 Claims, 8 Drawing Sheets

(56) References Cited

U.S. PATENT DOCUMENTS

| | | | | |
|---|---|---|---|---|
| 2005/0088054 | A1* | 4/2005 | Hartel | F04B 53/22 310/239 |
| 2018/0023719 | A1 | 1/2018 | Nakamura et al. | |
| 2018/0090859 | A1* | 3/2018 | Kemnitz | B60L 53/16 |
| 2022/0281281 | A1* | 9/2022 | Lauterbach | F04B 17/03 |

FOREIGN PATENT DOCUMENTS

| | | | | |
|---|---|---|---|---|
| DE | 102012014890 | A1 | 1/2014 | |
| DE | 102014103958 | A1 | 9/2015 | |
| DE | 102016118163 | A1 | 3/2018 | |
| DE | 102018122226 | A1 | 3/2020 | |
| DE | 102019111980 | A1 | 11/2020 | |
| DE | 102019118384 | A1 | 1/2021 | |
| DE | 102021105032 | A1 | 9/2022 | |
| EP | 2631486 | A1 | 8/2013 | |
| EP | 3088737 | A1 * | 11/2016 | F04B 35/04 |
| FR | 2671519 | A1 | 7/1992 | |

OTHER PUBLICATIONS

Extended Search Report issued on Aug. 1, 2024, in corresponding European Application No. 24160738.1, 23 pages.

Office Action issued on Sep. 5, 2025, in corresponding European Application No. 24160738.1, 10 pages.

Examination Report issued on Mar. 3, 2026, in corresponding European Application No. 24160738.1, 11 pages.

* cited by examiner 1
11a
11
14
10
31
33
12
30
13
32
32
23
31
211a
20
22
33
211
21a
212
212a
21

2
10
11
11a
12
13
14
20
20
21
21
21a
21a
22
22
23
23
30
30
32
32
32
32
211
211
211a
211a
212
212

2
30
32
21a
56
21
22
55
52
53
54
10,11a
51
20,21a
23
40

FLEXIBLE MOTOR PUMP SYSTEM

FIELD

The present invention relates to a hydraulic system for an active chassis of a vehicle, an axle set and a construction set therefor and a chassis axle and a chassis system with such a hydraulic system.

BACKGROUND

Active chassis systems are known, for example, from DE 39 02 743 C1 or DE 2 020 292 A1. A distinction is made here, for example, between completely active and semi-active chassis systems, in which the suspension can be regulated actively either for each wheel individually or per axle. An active chassis has hydraulically controllable shock absorbers, in which the two pressure chambers or damper chambers of the damper cylinder of a shock absorber are not merely interconnected via one or several, optionally controllable damping valves or throttle valves (damper adjustment valves), but in which, for example, the filling state of the cylinder chambers is controlled actively, and hydraulic forces can be guided correspondingly as needed into the chassis. The two cylinder chambers of a shock absorber can be connected, for example, parallel or alternatively to the damping valves or throttle valves, via a hydraulic pump that can be driven by an electric motor, and can optionally also drive said electric motor as an electric generator or electric motor generator (recuperation operation). Additionally or alternatively, also other settings optionally can be effected in the shock absorber with the aid of the pump.

By pumping hydraulic fluid it is possible, for example, to counteract pitching or rolling motions of the vehicle. Conversely, such an arrangement of shock absorber, hydraulic pump and electric motor can also feed electric energy obtained by recuperation back into the on-board network of the vehicle. Further, different shock absorbing behaviors can also be set, for example “soft” or “hard”, or also in dependence on the driving behavior and/or the road surface conditions.

The hydraulic pump and the electric motor generator or electric motor are thus generally employed in the active chassis for guiding hydraulic energy into or out of the (chassis) system. The pump and the electric motor form a common, compact construction unit here, which will be referred to in the following as motor-pump group and on which further an electronic unit (drive and/or regulation unit, ECU, electric control unit) is arranged fixedly, wherein the resulting compact construction unit is also referred to as motor-pump unit (MPU). Such motor-pump units and MPU axle sets based thereon are known, for example, from the document DE 10 2019 111 980 A1, the disclosure content of which is included in the disclosure content of the present document, in particular with respect to the configuration of the motor-pump units. Further, an MPU axle set with two motor-pump groups and a common electronic unit is known as a compact construction unit also from the document DE 10 2019 118 384 A1 and the document DE 10 2021 105 032 A1, the disclosure content of which is included in the disclosure content of the present document, in particular with respect to the configuration of the MPU axle sets and their casings. Such apparatuses thus convert electric energy into hydraulic energy and optionally also vice versa, and are also referred to as electrohydraulic machines.

However, an active chassis system frequently constitutes only optional equipment for a motor vehicle. Moreover, construction space is generally tight in motor vehicles. This makes the accommodation of such optional electrohydraulic machines more difficult, in particular if these are not taken into account at an early stage, for example during the so-called package distribution.

SUMMARY

It is the object of the invention to state an apparatus for supplying hydraulic energy in a chassis system, which can be adapted flexibly to tight construction space requirements. It is a further object of the invention to state a chassis axle and a chassis system, in particular with such an apparatus.

The apparatus according to the invention (in the following also referred to as motor-pump system or electrohydraulic machine) is an apparatus for supplying or for guiding in or out hydraulic energy, in particular into or out of a chassis system of a vehicle. The apparatus according to the invention comprises the following construction groups (or consists thereof):

a motor-pump group with a hydraulic pump and an electric motor or electric motor generator for driving the hydraulic pump, and an electronic unit for regulating or operating the motor-pump group, that is for emitting or exchanging control signals with the motor-pump group and/or for the electric power supply or for electrically driving the electric motor.

The motor-pump group is arranged in a motor-pump casing which simultaneously forms a motor-pump housing or is a part or a partial casing of a motor-pump housing and/or is set up to be a part or a partial casing of a motor-pump housing. Further, the electronic unit is arranged in an electronic-unit casing that simultaneously forms an electronic-unit housing or is a part or a partial casing of an electronic-unit housing and/or is set up to be a part or a partial casing of a electronic-unit housing.

A housing is presently understood to mean a (multi-piece) closed and/or sealed casing or overall casing, which accommodates or encloses exactly one construction group or several construction groups. A housing is sealed against soiling and other environmental influences, for example airtight, waterproof or splash-waterproof, whereby the at least one construction group accommodated in the housing can be installed, for example, on a vehicle lower side. A housing is further preferably also sealed or shielding against electromagnetic radiation, which is generated, for example, due to high alternating currents in the motor-pump system, in order to minimize or reduce the EMC exposure. Correspondingly, the motor-pump housing forms a housing for at least or exactly the motor-pump group, and the electronic-unit housing forms a housing for at least or exactly the electronic unit.

A casing is presently understood to mean a single-piece or multi-piece carrier for (exactly) one construction group. Preferably, the housing spans an interior space that accommodates or encloses the construction group of the casing partly or completely. Further, according to the invention, the casing forms a part or a partial casing of the housing and/or is set up to be a part or a partial casing of the housing of the respective construction groups. In the simplest case, the casing simultaneously forms the housing of the construction group and the outer side of the casing is simultaneously the outer side of the respective housing. However, usually the casing forms only or at least a part of the outer side of the respective housing, which is then composed of the casing and at least one (or several) further (corresponding) casings or partial casings.

The apparatus according to the invention further comprises (exactly or at least) a supply string that electrically connects the electronic unit and the motor-pump group. In the simplest case, the supply string or the electronic unit (via the supply string) completely makes available the complete electric supply of the motor-pump group or the supply string is the only electric connection of the motor-pump group. Then the apparatus has exactly one cable or supply string leading from the motor-pump group to the electronic unit.

The (external) supply string extends outside of the housings of the electronic unit and the motor-pump group, connects the two mutually different or spaced-apart construction groups or construction units or housings and thus creates a motor-pump system with two smaller construction units, for which a construction space can be found correspondingly more easily than for example for the larger construction unit of a compact motor-pump unit. The apparatus according to the invention thus creates greater flexibility and simplifies locating the required construction space, since the supply string can usually be configured as desired (with respect to length, extension path, shape, etc.). The supply string can be configured to be mechanically rigid or flexible here.

Preferably, in the apparatus according to the invention the motor-pump casing and the electronic-unit casing correspond with each other, meaning that they each have corresponding casing interfaces, so that the motor-pump casing and the electronic-unit casing can be joined together in order to form a common housing of the electronic unit and the motor-pump group, wherein the casing interfaces have, for example, (circumferential) abutment edges on the corresponding casing interfaces, which preferably immediately adjoin each other or abut on each other. In a preferred variant a common housing of the electronic unit and the motor-pump group is created exclusively by the electronic-unit casing and the motor-pump casing, so that the common housing consists (only or exactly) of the electronic-unit casing and the motor-pump casing. In an alternative variant the electronic-unit casing, the motor-pump casing and exactly one or several further partial casings create the common housing of the electronic unit and the motor-pump group. The common housing of the electronic unit and the motor-pump group then forms a compact motor-pump unit (with exactly one construction unit).

Correspondingly, the motor-pump casing and the electronic-unit casing are thus preferably set up to form, selectively, a compact motor-pump unit partly or completely. Correspondingly, it is also possible to employ same parts for both configurations (motor-pump system and compact motor-pump unit according to the invention), which additionally permits a high degree of adaptability to various construction space conditions.

The electric motor or the electric motor generator of the motor-pump group is preferably a brushless, permanently excited motor, in particular a synchronous motor, in particular a three-phase synchronous motor, with a stator the magnetic coils of which are preferably supplied via exactly three motor-phase supply lines or magnetic-coil supply lines and generate a rotating field for a rotor equipped with permanent magnets thereon. The electric motor is preferably a rotational-speed variable drive which can be operated as an actuator motor and is set up and provided for moving towards and/or holding in targeted manner predetermined settings or positions. The electric motor and the regulator (electronic unit) further preferably create a bidirectional drive, which can be operated in both rotational directions, and particularly preferably is also four-quadrant enabled, meaning that it can be operated also as an electric generator (electric motor generator) in both rotational directions and can thus also guide or take hydraulic energy out of the system, for example from the chassis, and convert it into electric energy.

The hydraulic pump of the motor-pump group is preferably a gear pump, particularly preferably an internal gear pump. It is preferably leakage-compensated, i.e. it has only small and/or negligible leakages, so that the conveyed amount of hydraulic fluid is fixedly coupled to the rotation or the number of rotations (high volumetric degree of efficiency). Correspondingly, the motor-pump group can preferably be operated as an actuator pump or actuator drive for a load, in particular a shock absorber, and is suitable, for example, to move towards and to hold in targeted manner predetermined hydraulic settings or positions of the load. The hydraulic system usually has no pressureless tank and/or the electric motor is preferably not operated in continuous operation and/or continuously at a constant rotational speed. A motor-pump group with a leakage-compensated internal gear pump for reversing operation is known, for example, from DE 10 2014 103 958 A1, the disclosure content of which is included in the disclosure content of the present document, in particular with respect to the configuration of the internal gear machine (axial sealing disks, radial sealing elements, etc.).

Preferably, the electronic-unit housing and/or the electronic-unit casing has, on the outer side, as electric interfaces, at least or exactly one bus interface (for example for a CAN bus or a LIN bus), exactly one supply voltage interface, in particular for a high voltage of, for example, 48 V or more, 400 V or more, or 800 V or more, and exactly one interface or one lead-through for the or each supply string.

In the motor-pump group the hydraulic pump and the electric motor or the electric motor generator are usually fixedly interconnected via a rotating motor shaft, wherein the motor shaft axle usually forms also a longitudinal axis for the motor-pump group. The motor-pump casing is usually a multi-piece casing and is composed of, for example

- a (single-piece or multi-piece) motor casing forming that section or part of the motor-pump casing that accommodates the electric motor or electric motor generator and preferably encloses it partly or completely, and
- a pump casing forming that section or part of the motor-pump casing that accommodates the pump and preferably encloses it partly or completely.

Alternatively, the motor-pump casing can be also a single-piece casing, in which the motor casing and the pump casing form corresponding casing sections.

The pump casing forms or comprises, for example, also a pump lid, which preferably (completely) encloses the pump on an axial front side of the motor-pump casing and/or (also) forms the axial front side of the motor-pump casing. Through the axial front side there extends the axis or the extension of the motor shaft of the motor-pump group. The axial front side preferably extends normally or substantially normally to the motor shaft axis and/or is preferably configured to be substantially or completely planar.

Further, the motor-pump group or the electric motor or electric motor generator within the motor-pump casing or within the motor casing preferably has no electric switching components and/or no integrated (electronic) components.

In a preferred embodiment of the apparatus according to the invention or the motor-pump system according to the invention, its motor-pump group forms a first motor-pump group and its components and associated construction groups form respectively first components and construction groups, meaning that the electric motor forms a first electric motor, the hydraulic pump forms a first hydraulic pump, the motor-pump casing forms a first motor-pump casing (for the first motor-pump group), the motor-pump housing forms a first motor-pump housing and the supply string forms a first supply string. In the preferred embodiment, the apparatus further comprises a second motor-pump group with a second hydraulic pump and a second electric motor for driving the second hydraulic pump.

The second motor-pump group is arranged in a second motor-pump casing here and the electronic unit forms a common electronic unit for regulating the first and the second motor-pump group.

In a first variant of this preferred embodiment of the apparatus according to the invention or of the motor-pump system with two motor-pump groups, the second motor-pump casing simultaneously forms a second motor-pump housing or a part or a partial casing of a second motor-pump housing and/or the second motor-pump casing is set up to be a part or a partial casing of a second motor-pump housing (that is different from the first motor-pump housing and the electronic-unit housing). The electronic unit and the second motor-pump group are then electrically connected via a second supply string. Preferably the second motor-pump group, the second motor-pump casing, the second motor-pump housing and/or the supply string is/are configured as described above (respectively for the motor-pump group, the motor-pump casing, the motor-pump housing and the supply string) and is/are preferably configured identically respectively with the first motor-pump group, the first motor-pump casing, the first motor-pump housing and/or the first supply string.

In this first variant of the apparatus according to the invention with two motor-pump groups thus a motor-pump system with three (small) construction units is created, for which construction space correspondingly can be found more easily than, for example, for the larger construction unit of a compact MPU axle set.

The apparatus according to the invention thus creates greater flexibility and simplifies locating the required construction space.

In a second variant of this preferred embodiment of the apparatus according to the invention or of the motor-pump system with two motor-pump groups, the second motor-pump casing forms a part of the electronic-unit housing, wherein the electronic-unit housing comprises the electronic-unit casing and the second motor-pump casing and preferably consists exactly thereof.

In this second variant of the apparatus according to the invention with two motor-pump groups the electronic-unit housing accommodates, besides the electronic unit, also the second motor-pump group.

In a preferred variant the electronic-unit housing is created exclusively by the electronic-unit casing and the second motor-pump casing, so that the electronic-unit housing consists (only or exactly) of the electronic-unit casing and the second motor-pump casing. In an alternative variant, the electronic-unit casing, the second motor-pump casing and exactly one or several further partial casings create the common housing (referred to as electronic-unit housing) of the electronic unit and the second motor-pump group.

The electronic-unit housing then forms a (compact) motor-pump unit (with the electronic unit and the second motor-pump group) with an additional (first) supply string for supplying the first motor-pump group. Thus a motor-pump system is created with two small construction units, for which a construction space correspondingly can be found more easily than, for example, for the larger construction unit of a compact MPU axle set, with the additional advantage of short paths/lines between the electronic unit and the second motor-pump group.

In the apparatus according to the invention with two motor-pump groups preferably the two motor-pump casings and the electronic-unit casing correspond to each other, i.e. they have respectively corresponding casing interfaces, so that the two motor-pump casings and the electronic-unit casing can be joined together to form a common housing of the electronic unit and the first and second motor-pump groups, wherein the casing interfaces have, for example, (circumferential) abutment edges at the corresponding casing interfaces, which preferably immediately adjoin each other or abut on each other. In a preferred variant the common housing of the three construction groups is created exclusively by the electronic-unit casing and the first and second motor-pump casings, so that the common housing consists (only or exactly) of the electronic-unit casing and the first and second motor-pump casings. In an alternative variant, the electronic-unit casing, the two motor-pump casings and exactly one or several further partial casings create the common housing of the electronic unit and the first and second motor-pump groups. The common housing of the electronic unit and the motor-pump groups then forms a compact MPU axle set (with exactly one construction unit).

Correspondingly, the motor-pump casing and the electronic-unit casing are thus preferably set up to partly or completely form, selectively, a compact motor-pump-unit axle set. Correspondingly, it is possible to employ same parts for both embodiments (apparatus or motor-pump system with two motor-pump groups, on the one hand, and compact motor-pump-unit axle set, on the other hand), additionally permitting a high degree of adaptability to various construction space conditions.

In a further preferred embodiment of the apparatus or the motor-pump system according to the invention, said apparatus or system has a total of four motor-pump groups (motor-pump system with four motor-pump groups). This embodiment comprises one of the two variants of the above-described apparatus according to the invention with two motor-pump groups or of the motor-pump system with two motor-pump groups and further comprises a third motor-pump group with a third hydraulic pump and a third electric motor for driving the third hydraulic pump, and a fourth motor-pump group with a fourth hydraulic pump and a fourth electric motor for driving the fourth hydraulic pump, wherein the third motor-pump group is arranged in a third motor-pump casing that simultaneously forms a third motor-pump group housing or a part or a partial casing of a third motor-pump housing and/or that is set up to be a part or a partial casing of a third motor-pump housing, and wherein the fourth motor-pump group is arranged in a fourth motor-pump casing that simultaneously forms a fourth motor-pump group housing or a part or a partial casing of a fourth motor-pump housing and/or that is set up to be a part or a partial casing of a fourth motor-pump housing.

The electronic unit and the third motor-pump group are then electrically connected via a third supply string and the electronic unit and the fourth motor-pump group are electrically connected via a fourth supply string. The electronic unit forms a central, common electronic unit for regulating the first, second, third and fourth motor-pump groups.

Preferably the third motor-pump group, the third motor-pump casing, the third motor-pump housing and/or the supply string are configured as described above (respectively for the motor-pump group, the motor-pump casing, the motor-pump housing and the supply string) and are preferably configured identically to respectively the first motor-pump group, the first motor-pump casing, the first motor-pump housing and/or the first supply string. Preferably the fourth motor-pump group, the fourth motor-pump casing, the fourth motor-pump housing and/or the supply string are configured as described above (respectively for the motor-pump group, the motor-pump casing, the motor-pump housing and the supply string) and are preferably configured identically to respectively the first motor-pump group, the first motor-pump casing, the first motor-pump housing and/or the first supply string. The first, second, third and fourth motor-pump groups are preferably configured to be respectively identical.

In this apparatus according to the invention with four motor-pump groups thus a motor-pump system is created with (depending on the variant) four or five (small) construction units, for which a construction space can be found correspondingly easily, while four shock absorbers can be supplied and regulated centrally at the same time. The apparatus according to the invention with four motor-pump groups thus creates greater flexibility and simplifies locating the required construction space.

The electronic unit of the motor-pump system, which constitutes a common electronic unit for all four motor-pump systems, advantageously controls the four motor-pump groups as a central unit, whereby, for example, a superordinate chassis control device which coordinates the electronic unit of several apparatuses or motor-pump systems as described above, can be omitted.

In a preferred embodiment of the apparatus or the motor-pump system the or a supply string or several or all supply strings are configured to be pluggable. For this purpose, for example, two corresponding supply connectors can be provided in the supply string in a predetermined position, for example half way between the electronic unit and the motor-pump group, so that the supply string has two supply-string sections or is subdivided into two supply-string sections (of different or equal length). Further, one lead-through each is preferably provided for the respective supply-string section in the housings and/or casings of the electronic unit and the motor-pump group.

Alternatively or additionally, the respective motor-pump housing or the respective motor-pump casing and/or the electronic-unit housing or the electronic-unit casing preferably has a supply connector fixedly arranged or attached on the outer side on or at the respective casing, said connector usually forming a casing lead-through at the same time. The supply string then has a corresponding supply connector on one or respectively both ends and is preferably uninterrupted.

The plug-in connection created respectively by corresponding supply connectors is preferably sealed, in particular waterproof or splash-waterproof, whereby the apparatus or the motor-pump system can further be installed, for example, on the lower side of a vehicle. Preferably, all supply strings of the apparatus are configured to be pluggable and identical.

Such a pluggable connection between the electronic unit and the motor-pump group or the electronic-unit housing and the motor-pump housing simplifies the mounting of the apparatus in the motor vehicle and the exchange of individual construction units.

In a preferred embodiment of the apparatus or the motor-pump system according to the invention the or a supply string or several or all supply strings have (respectively) at least or exactly three motor-phase supply lines.

The motor-phase supply lines are, for example, cores or single-core lines for the power supply of the electric motor of the respective motor-pump group. They connect the electronic unit or a power electronic of the electronic unit (immediately) with the magnetic coils in the motor-pump group or with the electric motor or with the stator. The motor-phase supply lines usually have a particularly high current conductivity and/or voltage resistance, which is increased, for example, compared to signal supply lines. The motor-phase supply lines preferably respectively have a line diameter in the range of 1 to 16 $mm^2$, which can amount to, for example, 1, 2, 3, 5, 7, 10, 12, 14 or 16 $mm^2$, wherein each of the values mentioned can also represent an upper or lower limit of the range of values. Alternatively or additionally, the motor-phase supply lines preferably have a voltage resistance for the high-voltage voltage level or the (highest) supply voltage of the electronic unit and/or have a voltage resistance of at least 48 V, 400 V or 800 V. All motor-phase supply lines are preferably configured identically.

In the simplest case the supply string consists exclusively of motor-phase supply lines. However, the supply string preferably further comprises two or more signal supply lines for regulating further components in the motor-pump group, for example pressure sensors. The signal lines are preferably laid out for voltages up to 12 V and currents in the milliampere range (for example maximally 10 mA).

Advantageously, the pump generally has at least one (integrated) pressure sensor, such as is known from the document EP 3 279 476 A1, for example, and the disclosure content of which is hereby included in the disclosure content of the present document with respect to the configuration, regulation and arrangement of the pressure sensor. Correspondingly, the electronic unit is preferably set up for regulating at least one pressure sensor in the hydraulic pump of the motor-pump group, said pressure sensor being regulated via the supply string.

Preferably, all supply strings are constructed in accordance with any one of the described variants. All supply strings preferably have at least an identical line diameter and/or identical voltage resistance, but can have different lengths. In the simplest case, all supply strings are constructed identically, thus simplifying mounting.

In a preferred embodiment of the apparatus or of the motor-pump system, the or a motor-pump casing or several or all motor-pump casings are (respectively) constructed in single-piece or preferably multi-piece manner, preferably of several one-piece or multi-piece, mutually corresponding casings, which form partial casings in the (respective) motor-pump casing, particularly preferably comprising a single-piece or multi-piece motor casing and a single-piece or multi-piece pump casing or consisting thereof. The motor-pump casing can be adapted with little effort thereby.

All motor-pump casings are preferably constructed in accordance with any one of the described variants and/or identically.

In a preferred embodiment of the apparatus or the motor-pump system, the or a motor-pump group or several or all motor-pump groups are (respectively) hydraulically connected to a shock absorber, in particular to pressure chambers in the damper cylinder of the shock absorber. The apparatus thus comprises further one or several shock absorbers which is/are respectively hydraulically connected to a motor-pump group or its pump. The hydraulic connection between a motor-pump group and the associated shock absorber comprises, for example, (a pair of) self-supporting and/or flexible hydraulic lines, in particular when the motor-pump group and the shock absorber are arranged at a distance from each other.

Preferably, the motor-pump group or the motor-pump casing or the motor-pump housing is arranged or attached (immediately) at the shock absorber or at the damper cylinder of the shock absorber. This permits shorter hydraulic lines. Advantageously, the pump casing of the motor-pump casing is hydraulically connected immediately to the shock absorber or the damper cylinder, in particular exclusively via casing-internal hydraulic lines and/or flexible and/or self-supporting hydraulic lines.

All motor-pump groups are preferably constructed in accordance with any one of the described variants and/or identically.

A chassis axle according to the invention comprises a first and a second motor-pump group which are configured as respectively described above, and a first and a second hydraulically regulatable shock absorber which are hydraulically connected respectively to the first and a second motor-pump group, wherein the first and the second motor-pump group each have a supply connector which is preferably arranged on the respective motor-pump casing or at the end of a supply-string section. The respective supply connectors permit a fast and secure connection of the electronic unit(s), for example after the mounting of the chassis axle in a motor vehicle.

The chassis axle preferably forms part of an apparatus as described above (or of a motor-pump system as described above) and/or is set up as a part thereof.

Alternatively or additionally a chassis axle comprises

- two apparatuses or motor-pump systems as described above, each having a motor-pump group, or
- one apparatus or one motor-pump system as described above, having two motor-pump groups, and two hydraulically regulatable shock absorbers which are hydraulically connected respectively to a motor-pump group.

The chassis axle is preferably pre-assembled, meaning that the motor-pump housings or the motor-pump casings of the motor-pump groups are fixedly connected to the chassis axle and/or the shock absorbers, and/or the hydraulic system (i.e. the shock absorbers, pump and optionally hydraulic supply lines) is filled with a hydraulic fluid (and thus ready for operation). The first and the second motor-pump group (and their arrangement on the chassis axle and/or respectively associated construction groups such as the motor-pump casing, motor-pump housing, shock absorber, hydraulic supply lines, etc.) are preferably configured identically and/or the chassis axle is configured symmetrically or middle-symmetrically (with reference to the chassis axle).

The motor-pump groups are preferably each hydraulically connected to the respective shock absorbers via self-supporting and/or flexible hydraulic lines, or the motor-pump casings or motor-pump housings are (immediately) arranged on or attached to the respective shock absorber or the damper cylinder of the respective shock absorber.

The invention further relates to an active chassis system for at least a first and a second vehicle axle, which respectively have two hydraulically regulatable shock absorbers. In the simplest case, the chassis system comprises an apparatus as described above or a motor-pump system as described above with four motor-pump groups, the motor-pump groups or hydraulic pumps of which are respectively hydraulically connected to one out of the total of at least four shock absorbers.

Alternatively, the chassis system comprises

- for the first vehicle axle:
  - a chassis axle as described above, or
  - an apparatus as described above or a motor-pump system as described above with two motor-pump groups, or
  - two apparatuses as described above or two motor-pump systems as described above with one motor-pump group, and
- for the second vehicle axle and optionally for further vehicle axles:
  - a chassis axle as described above, or
  - an apparatus as described above or a motor-pump system as described above with two motor-pump groups, or a compact MPU axle set, or
  - two apparatuses as described above or two motor-pump systems as described above with one motor-pump group, or two compact motor-pump units.

The two motor-pump groups of a vehicle axle are respectively hydraulically connected to one of the two shock absorbers of the vehicle axle.

Preferably, in each vehicle axle the two motor-pump groups (and their arrangement on the chassis axle and/or respectively associated construction groups, such as motor-pump casing, motor-pump housing, shock absorber, hydraulic supply lines, etc.) are configured identically and/or symmetrically or middle-symmetrically (with reference to a vehicle middle).

BRIEF DESCRIPTION OF THE DRAWINGS

The invention will hereinafter be described by way of example with reference to the attached drawings. The drawings are merely schematic representations and the invention is not limited to the specific represented embodiment examples.

DETAILED DESCRIPTION

Figure 1:
FIG. 1 shows a perspective exploded view of a motor-pump system with one motor-pump group.

In FIG. 1 a perspective exploded view is represented of an embodiment example of an apparatus 1 or of a motor-pump system 1 for making available hydraulic energy, in particular in a chassis system 50 of a vehicle with a motor-pump group 21*a*. The motor-pump system 1 comprises an electronic-unit housing 10, a motor-pump housing 20 and a supply string 30. The electronic-unit housing 10 is joined together from an electronic-unit casing 11 and a partial casing 12. The electronic-unit housing 11 spans an interior space which accommodates an electronic unit 11*a* (comprising electronic components, power electronics, circuit boards, etc.). The electronic-unit casing 11 here comprises a bus interface 13, a supply voltage interface 14 and a casing lead-through 33 for a supply string section 31 of a supply string 30.

The motor-pump housing 20 is joined together from a motor-pump casing 21 and partial casings 22 and 23. The motor-pump casing 21 spans an interior space which accommodates the motor-pump group 21*a*. The motor-pump casing 21 in the embodiment example is composed of a single-piece motor casing 211 and a multi-piece pump casing 212, which accommodate the electric motor or electric motor generator 211*a* and the hydraulic pump 212*a*, respectively. The electric motor 211*a* and the pump 212*a* are fixedly connected via a not represented rotatable motor shaft. Further, the pump casing 212 has on the axial front side hydraulic connectors for connecting, for example, a shock absorber 54, while the motor casing 211 has a casing lead-through 33 for a further supply string section 31 of a supply string 30.

The supply string 30 in the represented embodiment example is pluggable and for this purpose is composed of two supply string sections 31 which can be connected via supply connectors 32.

In the represented embodiment example the electronic-unit casing 11, the motor-pump casing 21 and the partial casing 22 (while omitting the partial casings 12 and 23) can also be joined together to form a common housing, so that a compact motor-pump unit is created.

Figure 2:
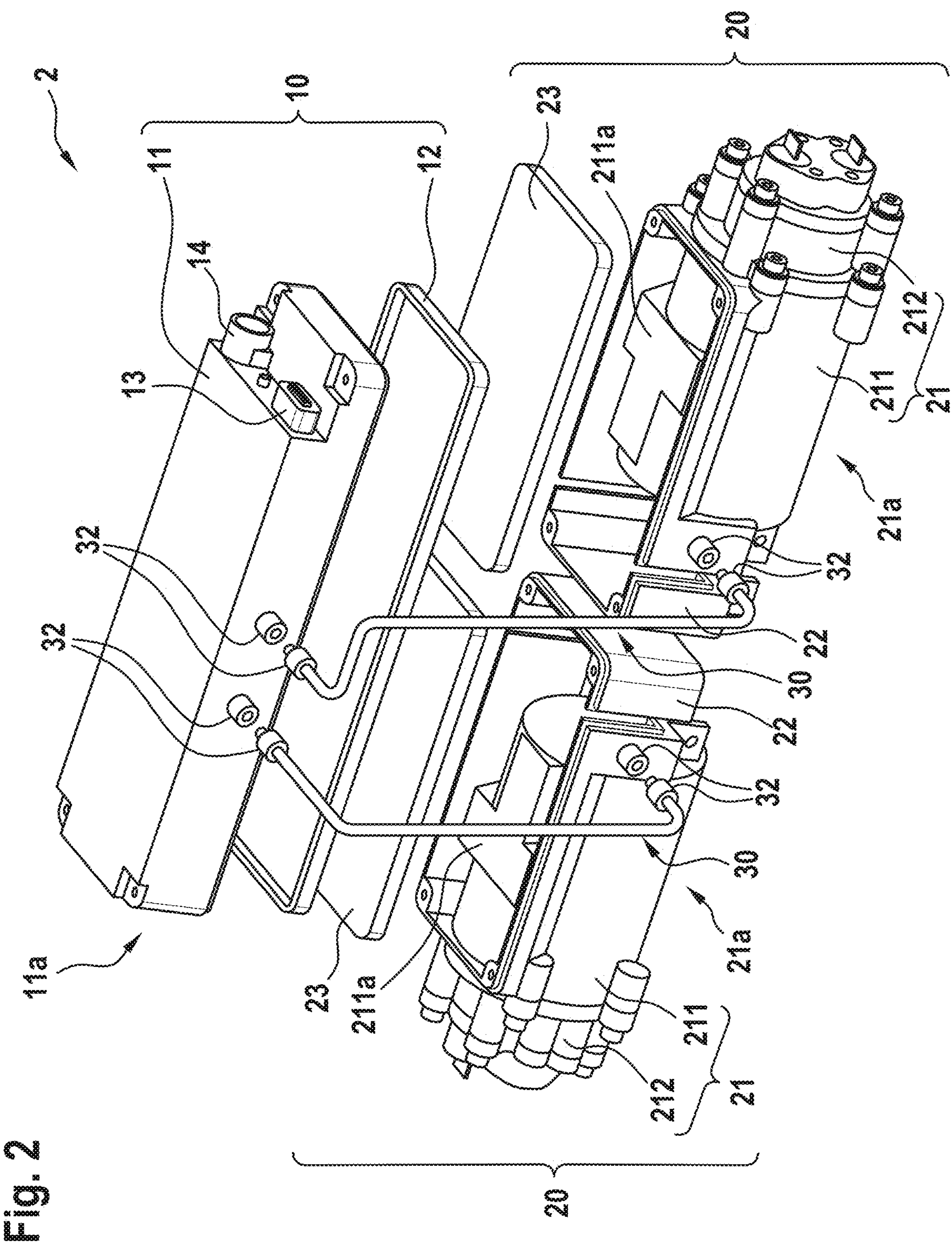
FIG. 2 shows a perspective exploded view of a motor-pump system with two motor-pump groups.

In FIG. 2 an embodiment example is represented of an apparatus 2 or of a motor-pump system 2 which comprises two motor-pump groups 21*a*. The motor-pump system is composed of an electronic-unit housing 10, two motor-pump housings 20 and two supply strings 30 which respectively connect a motor-pump housing 20 or a motor-pump group 21*a* to the electronic-unit housing 10 or the electronic unit 11*a*. The electronic unit 11*a* here forms a common electronic unit for both motor-pump groups 21*a*.

Further, in the embodiment example represented in FIG. 2 (instead of the casing lead-throughs 33 shown in the embodiment example in FIG. 1) there are provided supply connectors 32 respectively in the motor-pump casings 21 and in the electronic-unit casing 11, via which supply connectors respectively one supply string 30 with corresponding supply connectors 32 on both ends produces a pluggable electric supply connection between the electronic unit 11*a* and each of the motor-pump groups 21*a*. In a not represented embodiment example one or both supply strings 30 are configured like in the embodiment example of FIG. 1.

In the represented embodiment example the two motor-pump casings 21 and the electronic-unit casing 11 (while omitting the partial casings 12, 22 and 23) can also be joined together to form a compact motor-pump unit axle set.

In a not represented embodiment example the vehicle axle 56 or the chassis axle 51 is configured symmetrically, i.e. the hydraulic connector between the respective motor-pump group 21*a* and the shock absorber 54 is identical for both wheels 55.

Figure 3:
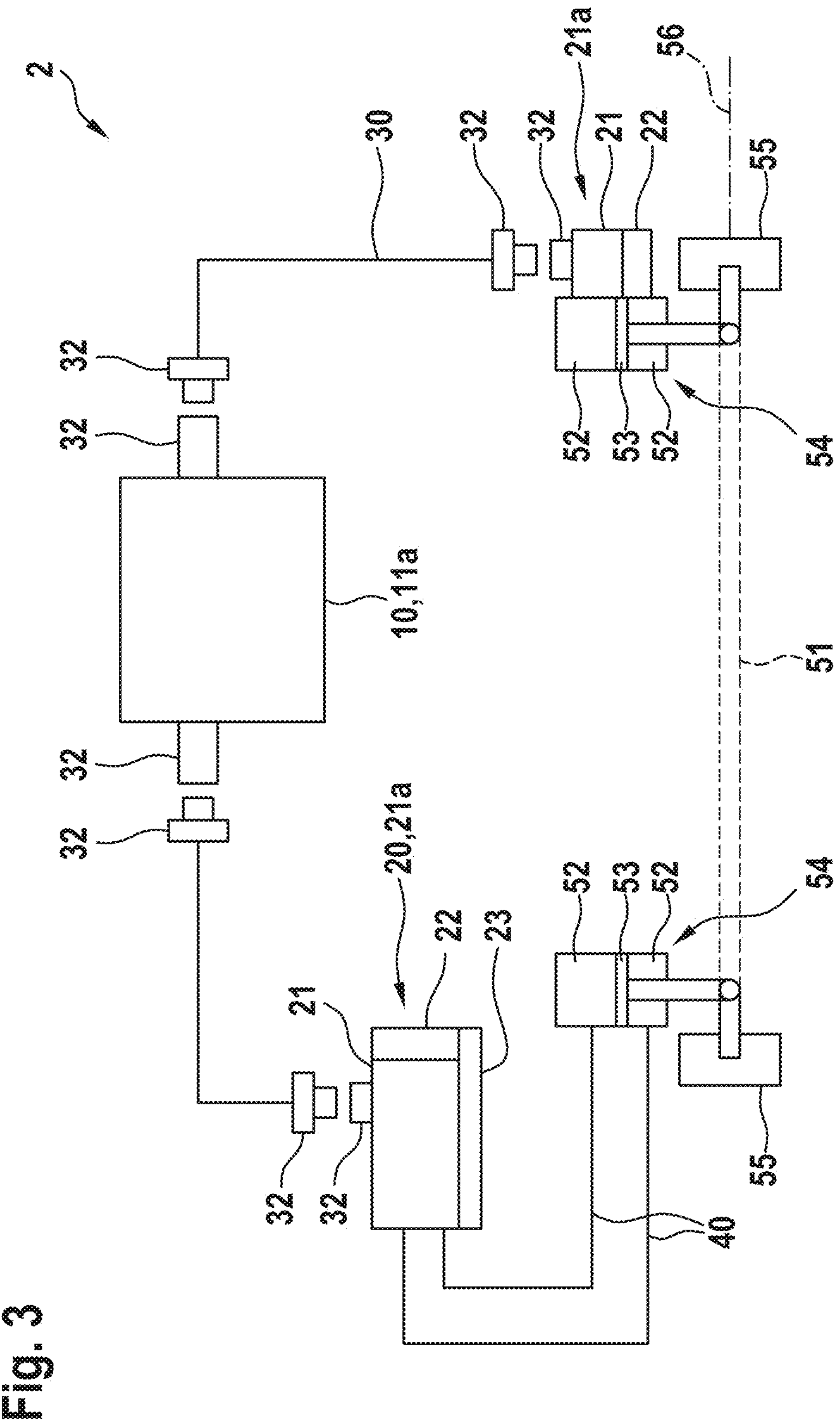
FIG. 3 shows a schematic view of a chassis axle with a motor-pump system with two motor-pump groups.

In FIG. 3 the shock absorbers 54 and the wheels 55 of a vehicle axle 56 are represented with an optional chassis axle 51 with a motor-pump system 2 with two motor-pump groups 21*a* connected thereto. A common, central electronic unit 11*a*, which is arranged in an electronic-unit housing 10, is connected via two pluggable supply strings 30 with corresponding supply connectors 32 to two motor-pump groups 21*a* which are arranged in corresponding motor-pump casings 21. The motor-pump group 21*a* represented in FIG. 3 on the left side is arranged in a motor-pump housing 20 which is joined together from a motor-pump casing and two partial casings 22 and 23. The motor-pump group 21*a* is connected via hydraulic lines 40 to the pressure chambers 52 of the shock absorber 54, said pressure chambers being separated by a piston 53.

The motor-pump group 21*a* represented in FIG. 3 on the right side, in contrast, is arranged directly on the shock absorber 54 or its damper cylinder. Correspondingly, in order to create a sealed housing around the motor-pump group 21*a*, the shock absorber 54 or its damper cylinder can assume the closing function of the partial casing 23, so that here a sealed housing for the motor-pump group 21*a* is created by the shock absorber 54 or the outer side of the shock absorber 54 and the motor-pump casing 21 and the partial casing 22.

Figure 4:
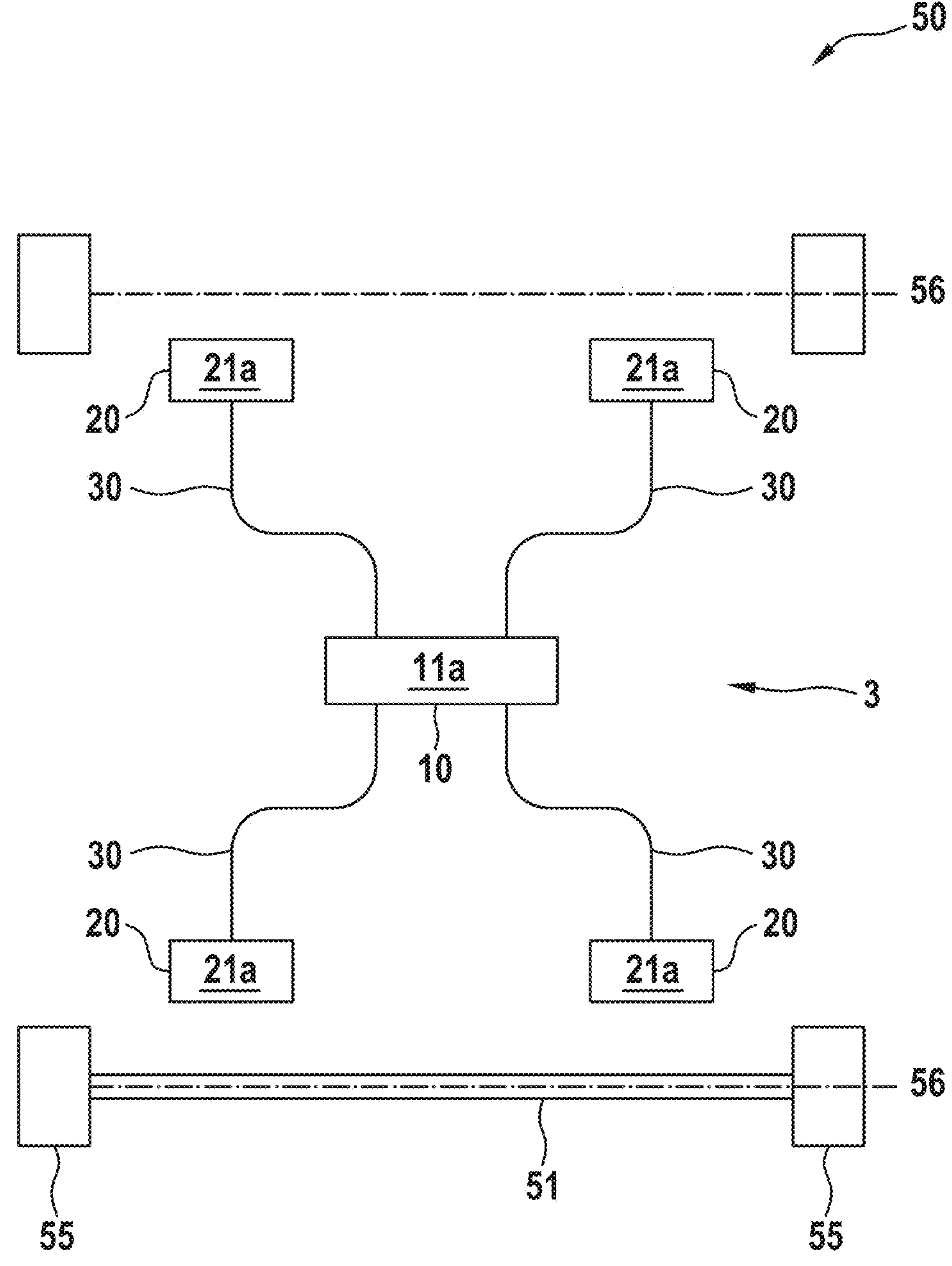
FIG. 4 shows a schematic view of a chassis system with a motor-pump system with four motor-pump groups.

FIG. 4 represents a chassis system 50. Said chassis system comprises an apparatus 3 or a motor-pump system 3 with four motor-pump groups 21*a* with a central, common electronic unit 11*a*. The motor-pump system 3 correspondingly comprises an electronic-unit housing 10 and four motor-pump housings 20, which are connected via respectively one (pluggable) supply string 30 to the electronic-unit housing 10. The hydraulic connection between the motor-pump groups 21*a* and the respective (not represented) damper cylinders 54 of the wheels 55 is effected, for example, using one of the two variants represented in the embodiment of FIG. 3. The two vehicle axles 56 can optionally comprise a chassis axle 51.

The hydraulic connection between a motor-pump group 21*a* and the respective shock absorber 54 is identical here on both wheels 55 of a given vehicle axle.

Figure 5A:
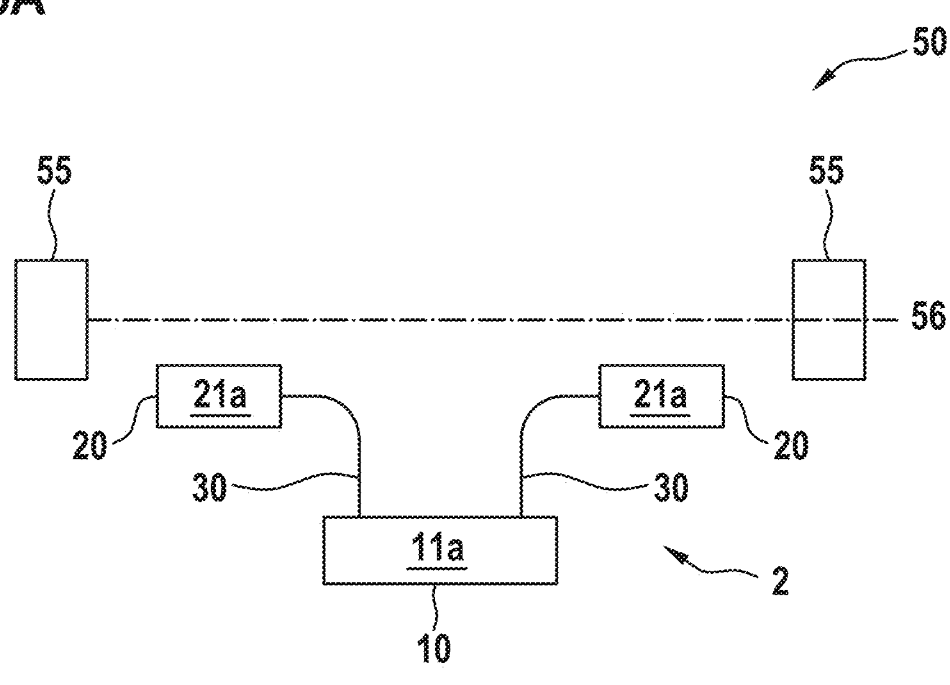
FIG. 5A shows a schematic views of a chassis system with a motor-pump system.
Figure 5A:
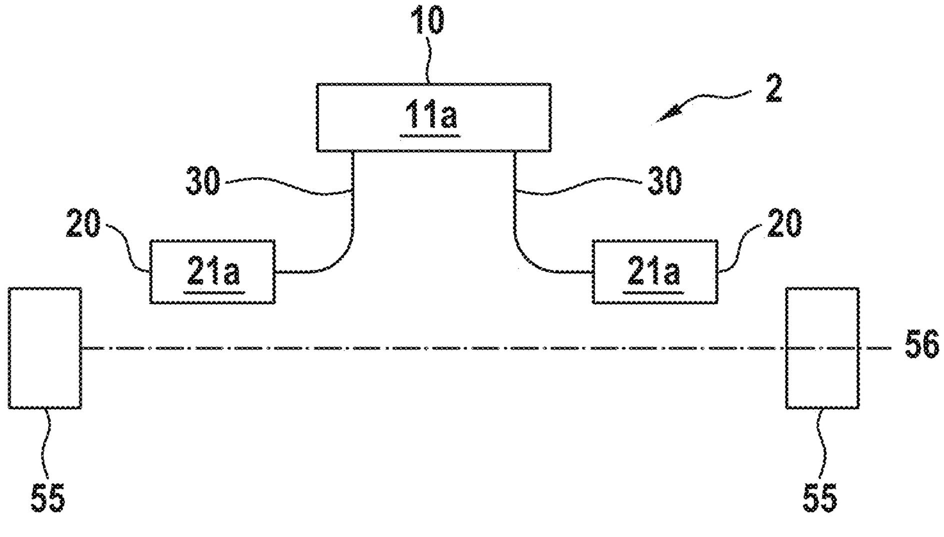

In FIG. 5A a further embodiment example of a chassis system 50 is represented. Said chassis system again comprises two vehicle axles 56 and a motor-pump system 2 with two motor-pump groups 21*a* on both axles. Both vehicle axles 56 correspondingly comprise respectively motor-pump systems 2 with three construction units, an electronic-unit housing 10 and two motor-pump housings 20, which are connected respectively via a supply string 30.

Figure 5B:
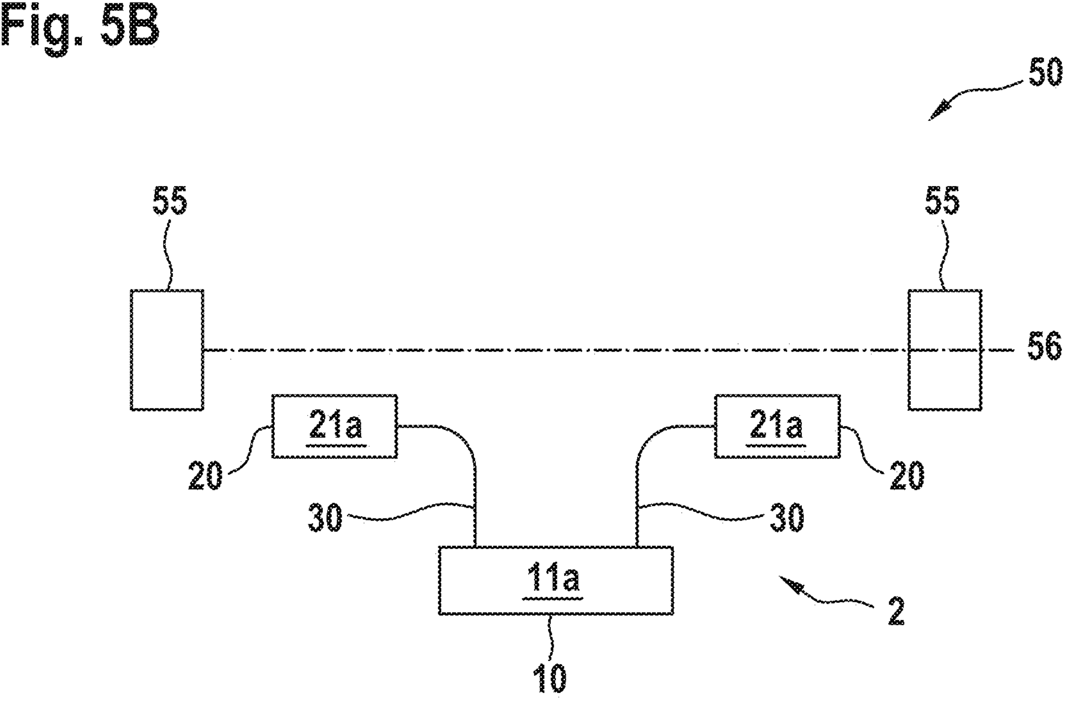
FIG. 5B shows a schematic views of a chassis system with a motor-pump system.
Figure 5B:
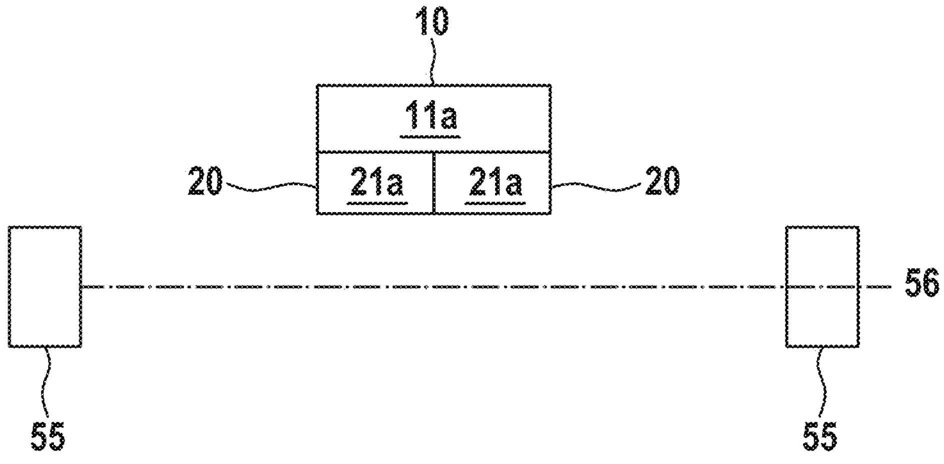
Figure 5C:
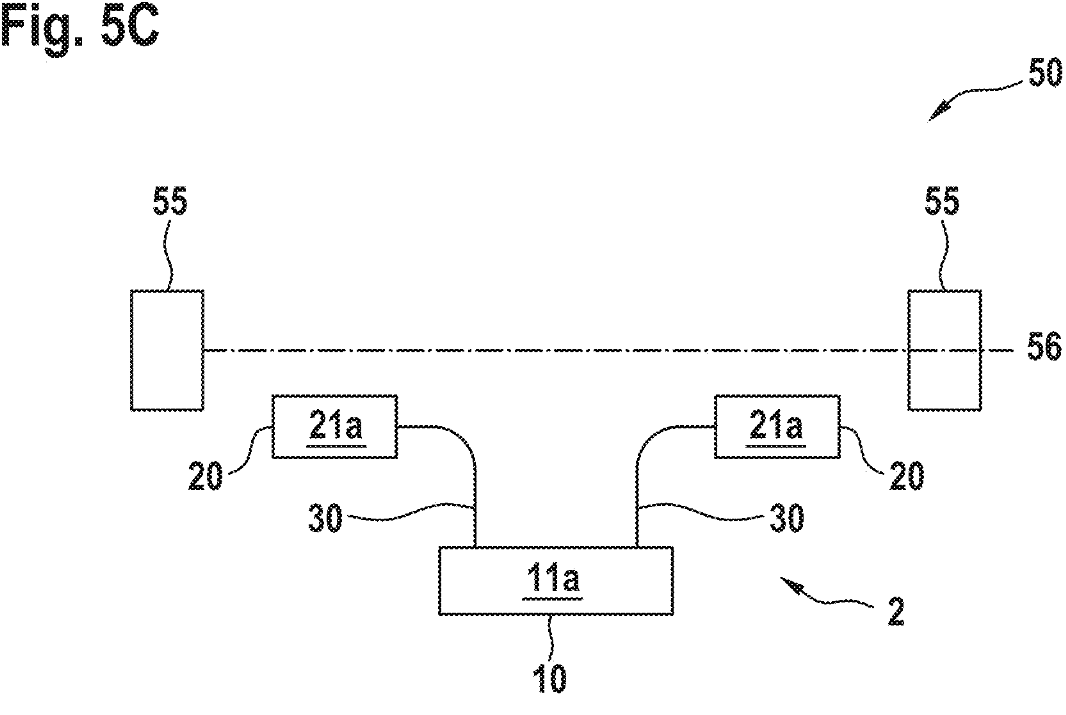
FIG. 5C shows a schematic views of a chassis system with a motor-pump system.
Figure 5C:
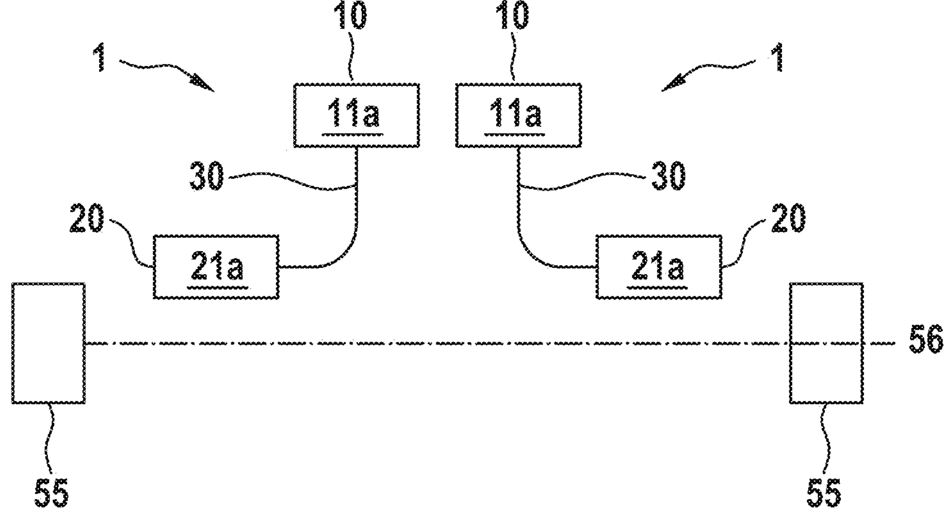
Figure 5D:
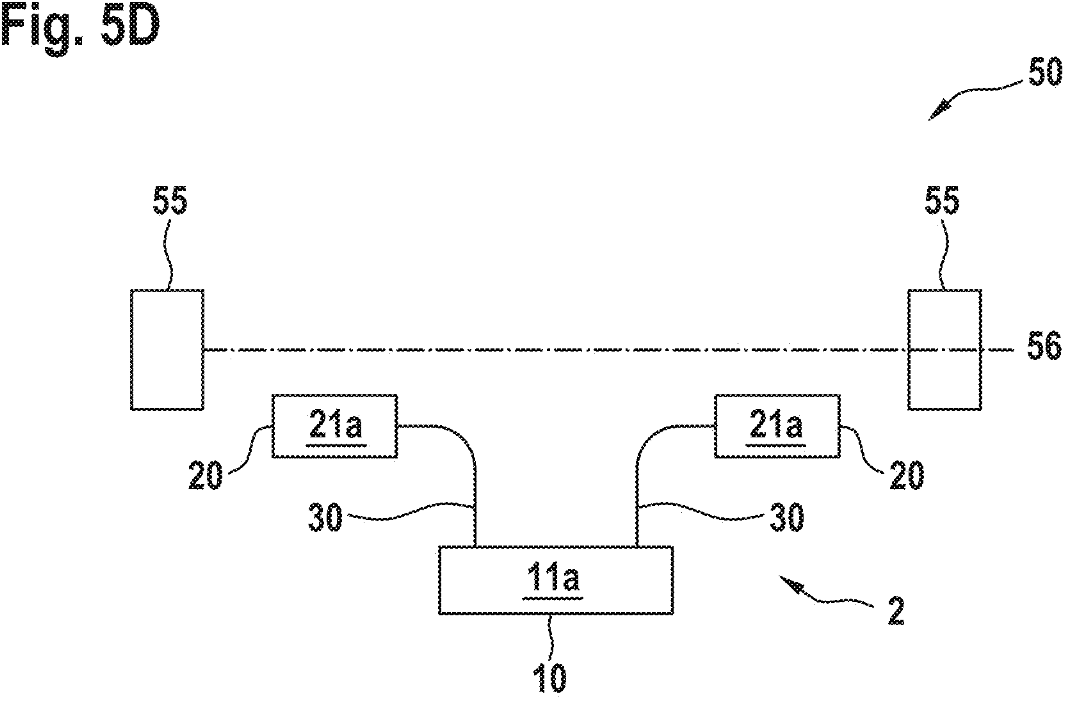
FIG. 5D shows a schematic views of a chassis system with a motor-pump system.
Figure 5D:
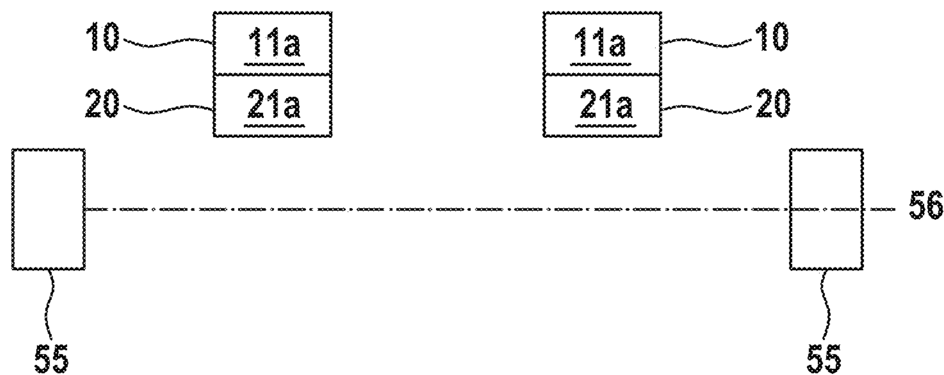

In the FIGS. 5B to 5D further embodiment examples of a chassis system 50 are represented, wherein the vehicle axle 56 on the top in the figures is respectively configured like in the embodiment example of FIG. 5A.

However, in the vehicle axle 56 represented at the bottom of FIG. 5B a compact motor-pump-unit axle set is provided.

In the vehicle axle 56 represented at the bottom of FIG. 5C there are provided two motor-pump systems 1 with respectively one motor-pump group 21*a*.

In the vehicle axle 56 represented at the bottom of FIG. 5D there are provided two compact motor-pump units.

LIST OF REFERENCE NUMERALS

1 motor-pump system with one motor-pump group 21*a*
2 motor-pump system with two motor-pump groups 21*a*
3 motor-pump system with four motor-pump groups 21*a*
10 electronic-unit housing
11 electronic-unit casing
11*a* electronic unit

12 partial casing
13 bus interface
14 supply voltage interface
20 motor-pump housing
21 motor-pump casing
21*a* motor-pump group
211 motor casing
211*a* electric motor, electric motor generator
212 pump casing
212*a* hydraulic pump
22 partial casing
23 partial casing
30 supply string
31 supply string section
32 supply connector
33 casing lead-through
40 hydraulic line
50 chassis system
51 chassis axle
52 pressure chamber
53 piston
54 shock absorber
55 wheel
56 vehicle axle

The invention claimed is:

1. An apparatus for making available hydraulic energy, in an active chassis system of a vehicle, the apparatus comprising a motor-pump group, comprising a hydraulic pump and an electric motor for driving the hydraulic pump, and an electronic unit for regulating the motor-pump group, wherein the motor-pump group is arranged in a first motor-pump casing, wherein the first motor-pump casing forms a motor-pump housing or is a part of the motor-pump housing, wherein the electronic unit is arranged in an electronic-unit casing that forms an electronic-unit housing or is a part of the electronic-unit housing, wherein the electronic unit and the motor-pump group are electrically connected via an external supply string;

wherein the external supply string is configured to be mechanically flexible; and wherein the motor-pump group is hydraulically connected to a shock absorber and is optionally arranged on the shock absorber and/or connected via hydraulic lines.

2. The apparatus according to claim 1, wherein the motor-pump casing and the electronic-unit casing correspond to each other and/or are set up to create partly or completely a common housing.

3. The apparatus according to claim 2, wherein the apparatus further comprises a chassis axle, the chassis axle comprising:

the motor-pump group as a first motor-pump group, the first motor-pump group comprising the hydraulic pump as a first hydraulic pump and the electric motor as a first electric motor for driving the first hydraulic pump, wherein the first motor-pump group is arranged in a first motor-pump casing that forms a first motor-pump housing or is a part of the first motor-pump housing, a second motor-pump group, comprising a second hydraulic pump and a second electric motor for driving the second hydraulic pump, wherein the second motor-pump group is arranged in a second motor-pump casing that forms a second motor-pump housing or is a part of the second motor-pump housing, a first hydraulically regulatable shock absorber and a second hydraulically regulatable shock absorber, the first hydraulically regulatable shock absorber and the second hydraulically regulatable shock absorber are hydraulically connected respectively to the first motor-pump group and a second motor-pump group, wherein the first motor-pump group and the second motor-pump group each have a supply connector, which is optionally arranged on the respective motor-pump casing and/or at an end of a supply string or at an end of a supply string section.

4. The chassis axle according to claim 3, wherein the chassis axle is pre-assembled and/or the first motor-pump casing and the second motor-pump casing and/or the first motor-pump unit and the second motor-pump unit are fixedly connected to the chassis axle or the respective shock absorbers, and/or wherein the first motor-pump group and the second motor-pump group are connected to the respective shock absorbers respectively via hydraulic lines or the first motor-pump casing and the second motor-pump casing or the first motor-pump housing and the motor-pump housing are arranged on and/or attached to the respective shock absorber or a damper cylinder of the respective shock absorber.

5. An apparatus according to claim 1, wherein the motor-pump group forms a first motor-pump group, wherein the apparatus further comprises a second motor-pump group, comprising a second hydraulic pump and a second electric motor for driving the second hydraulic pump, wherein the second motor-pump group is arranged in a second motor-pump casing and wherein the electronic unit forms a common electronic unit for regulating the first motor pump group and the second motor-pump group, and (a) wherein the second motor-pump casing forms a second motor-pump housing or is a part of the second motor-pump housing, and wherein the electronic unit and the second motor-pump group are electrically connected via a second supply string, or (b) wherein the second motor-pump casing is a part of the electronic-unit housing and/or wherein the electronic-unit housing comprises the electronic-unit casing and the second motor-pump casing.

6. The apparatus according to claim 5, wherein the first motor-pump casing, the second motor-pump casing and the electronic-unit casing correspond to each other and/or are set up to create a common housing partly or completely.

7. The apparatus according to claim 5, further comprising a third motor-pump group, comprising a third hydraulic pump and a third electric motor for driving the third hydraulic pump, wherein the third motor-pump group is arranged in a third motor-pump casing that forms a third motor-pump housing or is a part of the third motor-pump housing, and wherein the electronic unit and the third motor-pump group are electrically connected via a third supply string, and further comprising a fourth motor-pump group, comprising a fourth hydraulic pump and a fourth electric motor for driving the fourth hydraulic pump, wherein the fourth motor-pump group is arranged in a fourth motor-pump casing that forms a fourth motor-pump housing or is a part of the fourth motor-pump housing, and wherein the electronic unit and the fourth motor-pump group are electrically connected via a fourth supply string, and wherein the electronic unit forms the common electronic unit for regulating the first motor-pump group, the second motor-pump group, the third motor-pump group and the fourth motor-pump group, and wherein the first motor-pump group, the second motor-pump group, the third motor-pump group and the fourth motor-pump group are configured identically.

8. A chassis system for a first vehicle axle and a second vehicle axle, each with respectively two hydraulically regulatable shock absorbers, comprising:

the apparatus according to claim 7, wherein the four motor-pump groups or the hydraulic pumps of the four motor-pump groups are connected respectively to a shock absorber of the hydraulically regulatable shock absorbers of the first vehicle axle and the second vehicle axle.

9. The apparatus according to claim 1, wherein the supply string is pluggable and wherein a supply connector is arranged on an outer side of the electronic-unit housing and/or the motor-pump housing.

10. The apparatus according to claim 1, wherein the supply string has at least or exactly three motor-phase supply lines, and optionally two or more signal supply lines.

11. The apparatus according to claim 1, wherein the motor-pump housing is constructed in a single-piece manner or a multi-piece manner, optionally comprising a single-piece or multi-piece motor casing and a single-piece or multi-piece pump casing.

12. The apparatus according to claim 1, wherein the motor-pump group is hydraulically connected to a shock absorber and is optionally arranged on the shock absorber and/or connected via hydraulic lines.

* * * * *